United States Patent
Chiu et al.

(10) Patent No.: US 9,163,133 B2
(45) Date of Patent: Oct. 20, 2015

(54) METHOD OF CONVERTING A POLYMERIZABLE COMPOSITION INTO THERMOPLASTIC POLYURETHANE OF IMPROVED YELLOWNESS INDEX AND ARTICLE OBTAINED BY THIS METHOD

(75) Inventors: Hao-Wen Chiu, St. Petersburg, FL (US); Richard Neuzil, Seminole, FL (US); Timothy E. Herod, St. Petersburg, FL (US)

(73) Assignee: Essilor International (Compagnie générale d'Optique) (FR)

( * ) Notice: Subject to any disclaimer, the term of this patent is extended or adjusted under 35 U.S.C. 154(b) by 278 days.

(21) Appl. No.: 13/261,341

(22) PCT Filed: Dec. 23, 2009

(86) PCT No.: PCT/US2009/006717
§ 371 (c)(1),
(2), (4) Date: Feb. 26, 2013

(87) PCT Pub. No.: WO2011/078840
PCT Pub. Date: Jun. 30, 2011

(65) Prior Publication Data
US 2013/0158156 A1 Jun. 20, 2013

(51) Int. Cl.
- C08K 5/34 (2006.01)
- C08K 5/3417 (2006.01)
- C08K 5/3435 (2006.01)
- C08L 75/04 (2006.01)
- C08K 5/134 (2006.01)
- C08G 18/08 (2006.01)
- G02B 1/04 (2006.01)

(52) U.S. Cl.
CPC .......... *C08K 5/1345* (2013.01); *C08G 18/0895* (2013.01); *C08K 5/34* (2013.01); *C08K 5/3417* (2013.01); *C08K 5/3435* (2013.01); *G02B 1/043* (2013.01); *C08K 2201/014* (2013.01)

(58) Field of Classification Search
None
See application file for complete search history.

(56) References Cited

U.S. PATENT DOCUMENTS

| | | | |
|---|---|---|---|
| 5,334,673 A * | 8/1994 | Wu | 473/378 |
| 5,627,254 A | 5/1997 | Oriani | |
| 6,063,313 A * | 5/2000 | Briskin et al. | 264/15 |
| 6,187,859 B1 * | 2/2001 | Humphrey et al. | 524/590 |
| 6,709,748 B1 * | 3/2004 | Ho et al. | 428/423.1 |
| 6,949,595 B2 * | 9/2005 | Morgan et al. | 524/102 |
| 7,262,235 B2 * | 8/2007 | Bulpett et al. | 524/91 |
| 8,270,089 B2 * | 9/2012 | Chiu et al. | 359/652 |
| 2002/0086924 A1 * | 7/2002 | King, III | 524/237 |
| 2006/0142441 A1 * | 6/2006 | Chan et al. | 524/100 |
| 2013/0158156 A1 * | 6/2013 | Chiu et al. | 523/105 |

FOREIGN PATENT DOCUMENTS

| | | |
|---|---|---|
| CN | 1217001 A | 5/1999 |
| CN | 101516945 A | 8/2009 |
| WO | 2008/033659 A1 | 3/2008 |
| WO | 2008/124288 A1 | 10/2008 |

OTHER PUBLICATIONS

International Search Report and Written Opinion, PCT/US2009/006717, dated Oct. 12, 2010.

* cited by examiner

Primary Examiner — James J Seidleck
Assistant Examiner — Peter A Salamon
(74) Attorney, Agent, or Firm — Lerner, David, Littenberg, Krumholz & Mentlik, LLP

(57) ABSTRACT

Method of producing a thermoplastic polyurethane having a light stabilization useful for ophthalmic applications, comprising combining precursors of a polyurethane and at least one antioxidant, and incorporating therein, either before, during or after polymerization, at least one light stabilizer, said method being characterized in that the antioxidant is benzenepropanoic acid, 3(1,1-dimethylethyl)-4-hydroxy-5-methyl-1,1'-[1,2-ethanediylbis(oxy-2,1-ethanediyl)]ester and the light stabilizer is bis(1,2,2,6,6-pentamethyl-4-piperidinyl)-[[3,5-bis(1,1-dimethylethyl)-4-hydroxyphenyl]methyl] butylmalonate together with at least one additional component chosen from among phenol, 2-(5-chloro-2H-benzotriazole-2-yl)-6-(1,1-dimethylethyl)-4-methyl and 2,2'-methylenebis(6-(2H-benzotriazol-2-yl)-4-1,1,3,3-tetramethylbutyl)phenol).

26 Claims, 1 Drawing Sheet

METHOD OF CONVERTING A POLYMERIZABLE COMPOSITION INTO THERMOPLASTIC POLYURETHANE OF IMPROVED YELLOWNESS INDEX AND ARTICLE OBTAINED BY THIS METHOD

CROSS REFERENCE TO RELATED APPLICATIONS

The present application is a national phase entry under 35 U.S.C. §371 of International Application No. PCT/US2009/006717, filed Dec. 23, 2009, published in English, which is incorporated herein by reference herein.

BACKGROUND OF THE INVENTION

The present invention pertains to a method of converting a polymerizable composition into thermoplastic polyurethane. The invention particularly concerns articles obtained by shaping the thermoplastic polyurethane obtainable by this method. These articles are used in eyewear lenses such as in sunwear, ophthalmic products, safety glasses, shields and goggles.

DESCRIPTION OF THE INVENTION

When the thermoplastic polyurethane is a thermoplastic aromatic based polyurethane, the polymerizable composition usually comprises at least one polyol, at least one aromatic isocyanate, at least one chain extender and stabilizers such as antioxidant and light stabilizer(s).

The material used to produce eyewear lenses must be optically clear. In addition, the finished product must meet specifications with regards to the colour of the product. In particular the colour has to remain stable during the life of the product. Certain materials are not suitable for use in eyewear applications due to a high initial yellowness index (YI) and/or due to an increasing YI because of its instability to UV light.

This is the case of the commercially available thermoplastic polyurethane ISOPLAST® 301 produced by LUBRIZOL ADVANCED MATERIALS. This material is used in a variety of other applications where high toughness, chemical resistance and transparency are required.

Therefore, there is still a need for a method for producing thermoplastic polyurethanes which can be used in eyewear applications, which overcomes the limitations of the known thermoplastic polyurethanes, without compromising other optical and mechanical properties. Advantageously, the present invention is directed to a method that addresses the issues discussed above. These and other advantages are achieved in accordance with the present invention as described below.

The invention provides a method of converting a polymerizable composition into thermoplastic polyurethane, said composition comprising precursors of polyurethane and at least one antioxidant, said method comprising the incorporation of at least one light stabilizer in said composition or in the reactive mixture during the conversion step, said method being characterized in that: the antioxidant is benzenepropanoic acid, 3(1,1-dimethylethyl)-4-hydroxy-5-methyl-1,1'-[1,2-ethanediylbis(oxy-2,1-ethanediyl)]ester and the light stabilizer is bis(1,2,2,6,6-pentamethyl-4-piperidinyl)-[[3,5-bis(1,1-dimethylethyl)-4-hydroxyphenyl]methyl]butylmalonate together with at least one component selected from the group of phenol, 2-(5-chloro-2H-benzotriazole-2-yl)-6-(1,1-dimethylethyl)-4-methyl and 2,2'-methylenebis(6-(2H-benzotriazol-2-yl)-4-1,1,3,3-tetramethylbutyl)phenol), and wherein phenol, 2-(5-chloro-2H-benzotriazole-2-yl)-6-(1,1-dimethylethyl)-4-methyl is preferably present.

The conversion is usually a polymerization.

The compound "benzenepropanoic acid, 3(1,1-dimethylethyl)-4-hydroxy-5-methyl-1,1'-[1,2-ethanediylbis(oxy-2,1-ethanediyl)]ester" can be the commercial product Irganox® 245, sold by Ciba part of BASF. Irganox® 245 is a hindered phenolic antioxidant of CAS No.: 36443-68-2.

The compound "bis(1,2,2,6,6-pentamethyl-4-piperidinyl)-[[3,5-bis(1,1-dimethylethyl)-4-hydroxyphenyl]methyl]butylmalonate" can be the commercial product Tinuvin® 144, sold by Ciba part of BASF. This compound is of CAS No.: 63843-89-0. It is a Hindered Amine Light Stabilizer (or HALS).

The compound "phenol, 2-(5-chloro-2H-benzotriazole-2-yl)-6-(1,1-dimethylethyl)-4-methyl" can be the commercial product Tinuvin® 326, sold by Ciba part of BASF. This compound is of CAS No.: 3896-11-5. It is an Ultraviolet Absorbent (or UVA).

The compound "2,2'-methylenebis(6-(2H-benzotriazol-2-yl)-4-1,1,3,3-tetramethylbutyl)phenol)" can be the commercial product Tinuvin® 360, sold by Ciba part of BASF. This compound is of CAS No.: 103597-45-1. It is an Ultraviolet Absorbent (or UVA).

When the thermoplastic polyurethane is a thermoplastic aromatic based polyurethane, the precursors of the thermoplastic polyurethane are: at least one polyol, at least one chain extender, and at least one aromatic isocyanate.

According to the invention, the benzenepropanoic acid, 3(1,1-dimethylethyl)-4-hydroxy-5-methyl-1,1'-[1,2-ethanediylbis(oxy-2,1-ethanediyl)]ester is present in the range of 0.1 to 1% and preferably from 0.1 to 0.5% by weight; bis(1,2,2,6,6-pentamethyl-4-piperidinyl)-[[3,5-bis(1,1-dimethylethyl)-4-hydroxyphenyl]methyl]butylmalonate is present in the range of 0.1 to 1% and preferably from 0.1 to 0.5% by weight; and the component or components chosen from phenol, 2-(5-chloro-2H-benzotriazole-2-yl)-6-(1,1-dimethylethyl)-4-methyl or 2,2'-methylenebis(6-(2H-benzotriazol-2-yl)-4-1,1,3,3-tetramethylbutyl)phenol), preferably phenol, 2-(5-chloro-2H-benzotriazole-2-yl)-6-(1,1-dimethylethyl)-4-methyl, when chosen is each present in the amount of 0.1 to 1% and preferably from 0.1 to 0.5% by weight.

For example, a composition which can be used in the method of the invention for preparing polyurethane comprises: benzenepropanoic acid, 3(1,1-dimethylethyl)-4-hydroxy-5-methyl-1,1'-[1,2-ethanediylbis(oxy-2,1-ethanediyl)]ester in the amount of about 0.33% by weight; bis(1,2,2,6,6-pentamethyl-4-piperidinyl)-[[3,5-bis(1,1-dimethylethyl)-4-hydroxyphenyl]methyl]butylmalonate in the amount of about 0.33% by weight; and the component or components selected from phenol, 2-(5-chloro-2H-benzotriazole-2-yl)-6-(1,1-dimethylethyl)-4-methyl or 2,2'-methylenebis(6-(2H-benzotriazol-2-yl)-4-1,1,3,3-tetramethylbutyl)phenol), in the amount of about 0.33% by weight.

According to the invention, the thermoplastic polyurethane is at least one of the commercial products sold by Lubrizol Advanced Materials ISOPLAST® 301, ISOPLAST® 2530 and ISOPLAST® 2531, preferably ISOPLAST® 301.

The method according to the invention is rapid, reproducible and easy to carry out.

The thermoplastic polyurethane is preferably a commercially available product, or it can be manufactured just before or during the conversion.

Preferably, in addition to the components described above for producing the polyurethane of the invention, the polymerizable composition can further comprise one or more other ingredients such as a carrier, a dye, or any other ingredient known to one skilled in the art.

The stabilizing additives and other components according to the invention can be incorporated in any combination or sequence with the precursors of the thermoplastic polyurethane, e.g., individually or together, or incorporated during the conversion step in a reaction extruder, e.g. from a side feeder or after polymerization in a subsequent extruder.

The light-stabilized TPU is usually in the form of pellets and/or powder.

The three stabilizing additives according to the invention are generally incorporated during the conversion step, as described below:

In a first case, the precursors of thermoplastic polyurethane and the antioxidant are mixed together, and the reaction mixture is fed to a reaction extruder which carries out the conversion according to the invention (TPU polymerisation) and which provides light-stabilized TPU pellets. The light stabilizers can be incorporated in the precursors, independently or not of the incorporation of the antioxidant, or the light stabilizers can be incorporated in the reaction extruder, from a side feeder during the reactive extrusion.

In a second case, the precursors of thermoplastic polyurethane and the antioxidant are mixed together, and the mixture is fed to a reaction extruder which carries out the TPU polymerisation and which provides TPU pellets. These antioxidant-stabilized TPU pellets are fed into a second extruder with the light stabilizers for carrying out the conversion according to the invention, and providing light-stabilized TPU pellets. In this case, the light stabilizers are usually in the form of pellets.

The invention also concerns the thermoplastic polyurethane obtainable according to this method.

Advantageously, according to the invention, the combination of the specific stabilizing additives (that is to say the antioxidant and the light stabilizers), for example at the level of approximately 0.33% by weight of each additive, improves the overall UV stability of the thermoplastic polyurethane better than other known additives. The combination of the stabilizing additives with polyurethane in accordance with the invention appears to provide a synergistic effect.

The invention also concerns any article, preferably an ophthalmic lens, formed by the shaping of the thermoplastic polyurethane of the invention into the desired shape or configuration.

The article is generally used alone or as part of a product or device, where light passes through the article, and the light passing through the article will be detected by eyes or by a device for detecting the quality or other properties of the light. Most preferably, the article is used as eyewear lenses, such as in sunwear, ophthalmic lenses, safety glasses, shields and goggles.

The article, in the sense of the present invention, should be understood to mean an uncoated article. The article may in particular be an optically transparent material having the shape of an optical article.

Said article can further comprise a coating over at least a portion of a surface of the article. Said article is advantageously coated with coatings conventionally used in the ophthalmic optics field, such as antiabrasion coatings, scratch resistant coatings or anti-reflection coatings.

The invention thus also concerns said article further comprising at least a partial coating.

According to a preferred embodiment, the article has a Yellowness Index that does not increase by more than 4.0, preferably by not more than 2.5, in 200 hours of exposure in the Suntest.

The Suntest is a test which involves an exposure of plano test samples with a thickness of 2.0 mm, for 200 hours, of a xenon lamp (60+/−6 Klux by adjusting $Wcm^2$ in the equipment). Filters are providing full day light spectrum from 295 to 780 nm (coated quartz lass/special UV glass/reflecting mirror UV/light).

The Yellowness Index is measured according to ASTM D 1925.

The method of the invention provides advantageously thermoplastic polyurethanes which are of improved Yellowness Index during their life: the initial Yellowness Index is not too high and it does not increase too much during the life of the thermoplastic polyurethane.

BRIEF DESCRIPTION OF THE DRAWINGS

The techniques of the present invention will be readily understood by considering the accompanying drawings.

DETAILED DESCRIPTION

Figure 1:
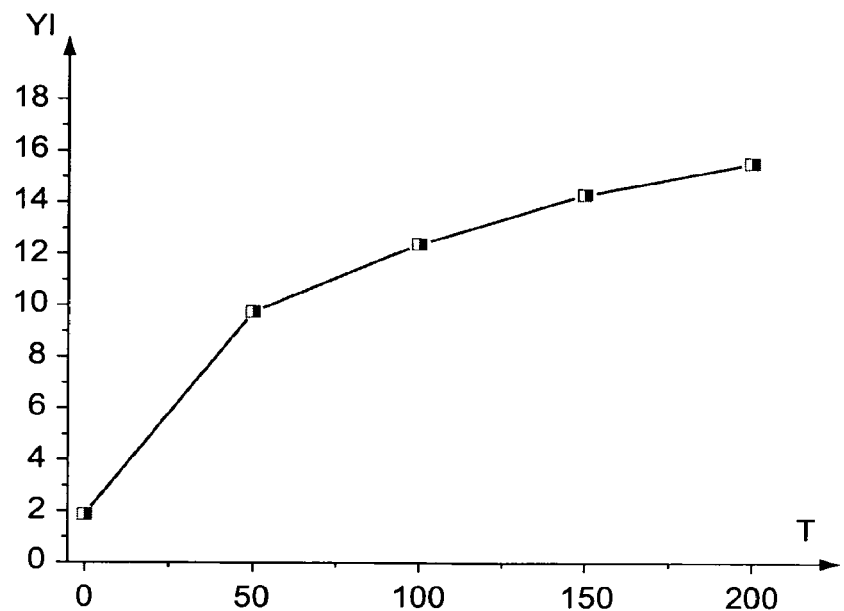
FIG. 1 is a diagram showing a curve of the measurements of the Yellowness Index (YI) with respect to the time of UV exposure (T, in hours) for one lens (comparative)
Figure 2:
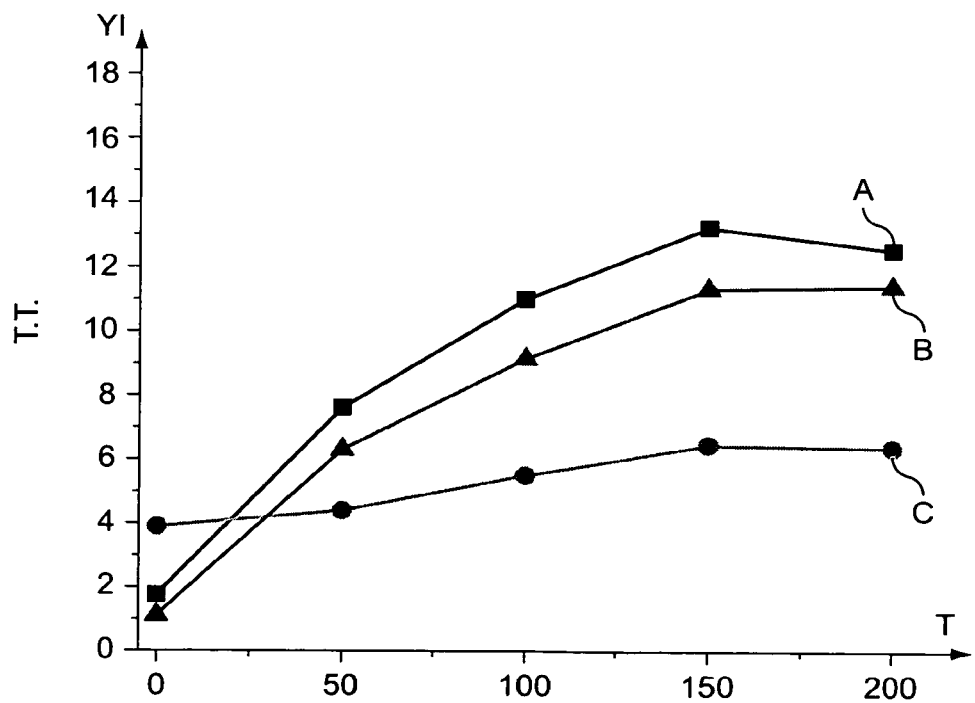
FIG. 2 represents three curves on the same diagram showing the measurements of the Yellowness Index (YI) with respect to the time of UV exposure (T, in hours) for three lenses (two lenses A and B are comparative and one lens, C, is according to the invention).

FIGS. 1 and 2 will be explained in the following examples.

The invention is further illustrated by the following non-limiting examples which are given for illustrative purposes only.

EXAMPLES

In all the examples, the article is the commercially available compound ISOPLAST® 301 obtained from the company Lubrizol Advanced Materials.

Example 1

Comparative Example

A 2.0 mm plano lens made from ISOPLAST® 301 is subjected to UV light, using a standard UV stability measurement method, the 200 hours Suntest explained above.

The results of the measurements on said ophthalmic lens are given in FIG. 1, in which YI is the ordinate giving the Yellowness Index (YI), and T is the abscissa giving the time of UV exposure (in hours).

The lens shows an increasing YI value.

Example 2

ISOPLAST® 301 was injection moulded into a first 2.00 mm C.T. lens (lens A, comparative).

ISOPLAST® 301 was injection moulded with Irganox® 245 alone into a second 2.00 mm C.T. lens (lens B, comparative).

Irganox® 245, Tinuvin® 144 and Tinuvin® 326, all from Ciba Additives, at the level of approximately 3000 ppm of each additive, were compounded into ISOPLAST 301 and the thus obtained mixture was injection moulded in a third 2.00 mm C.T. lens (lens C, according to the invention).

For each of these three lenses, the YI was measured at specific intervals after exposure to light, simulating an accelerated exposure to sun light in the 200 hours Suntest.

The results of the measurements on said ophthalmic lens as are given in FIG. 2, in which YI is the ordinate giving the Yellowness Index (YI), and T is the abscissa giving the time of UV exposure (in hours). The A curve is for the A lens (ISOPLAST® 301 with no additives), the B curve is for the B lens (ISOPLAST® 301 and only antioxidant Irganox 245 as an additive), and the C curve is according to the invention, the C lens with ISOPLAST® 301 and the three additives as explained above.

The lenses A and B show an increasing YI value.

The lens C shows a stabilized YI value, with an increased in YI not exceeding 2.0 over 200 hours in Suntest.

Example 3

Additional screening for other additives for UV stabilization were performed and compared to the specific additive combination of the invention. The comparison includes the best commercially available UV stabilizing additive blend sold by Ciba: Tinuvin® PUR 866. Blends were compounded in a manner similar to that in the previous examples, and 1.0 C.T. lenses were injection moulded and measured for YI during the 200 hours Suntest.

The results of the measurements are given in the Table below, the comparative examples are given in the two first lines of this Table, the examples according to the invention are in the two last lines of this Table.

| Antioxidants | HALS | UV Absorber | Initial YI | YI after 200 Hour Sun Test | Delta YI |
|---|---|---|---|---|---|
| | None | | 2.6 | 19.9 | 17.3 |
| 0.33% Irganox 245 | 0.67% PUR 866 | | 3.3 | 12.3 | 9.0 |
| 0.33% Irganox 245 | 0.33% Tinuvin 144 | 0.33% Tinuvin 360 | 5.5 | 9.3 | 3.8 |
| 0.33% Irganox 245 | 0.33% Tinuvin 144 | 0.33% Tinuvin 326 | 4.0 | 5.9 | 1.9 |

The data clearly shows that the use of the additives according to the invention give better results in both cases, that is to say the lowest increase in YI over 200 hours Suntest (1.9 and 3.8 with respect to 9.0 and 17.3). The use of the combination of the three additives according to the invention gives 60% less in the increase in the YI compared to the use of Ciba Tinuvin® PUR 866. The use of Irganox® 245, Tinuvin® 144 and Tinuvin® 326 (1.9) gives even better results than the use of Irganox® 245, Tinuvin® 144 and Tinuvin® 360 (3.8).

The invention claimed is:

1. A method of converting a polymerizable composition into thermoplastic polyurethane for use as an ophthalmic lens, said method comprising:
    combining precursors of the polyurethane with a plurality of additives including:
        (i) an antioxidant which is benzenepropanoic acid, 3(1,1-dimethylethyl)-4-hydroxy-5-methyl-1,1'-[1,2-ethanediylbis(oxy-2,1-ethanediyl)] ester is present in the amount of 0.1 to 1% by weight;
        (ii) a light stabilizer component bis(1,2,2,6,6-pentamethyl-4-piperidinyl)-[[3,5-bis(1,1-dimethylethyl)-4-hydroxyphenyl]methyl]butylmalonate is present in the amount of 0.1 to 1% by weight; and
        (iii) phenol, 2-(5-chloro-2H-benzotriazole-2-yl)-6-(1,1-dimethylethyl)-4-methyl present in the amount of 0.1 to 1% by weight;
    and conducting a conversion step forming a thermoplastic polyurethane.

2. The method of claim 1 wherein the components (ii) and (iii) are combined with the polyurethane precursors and antioxidant by being fed from a side feeder in a reaction extruder.

3. A method of converting a polymerizable composition into a thermoplastic polyurethane for use as an ophthalmic lens, said method comprising:
    combining precursors of the polyurethane with the antioxidant which is benzenepropanoic acid, 3(1,1-dimethylethyl)-4-hydroxy-5-methyl-1,1'-[1,2-ethanediylbis(oxy-2,1-ethanediyl)]ester and is present in the amount of 0.1 to 1% by weight;
    conducting a polymerization reaction;
    combining the antioxidant polymerized product with:
        (i) the light stabilizer component bis(1,2,2,6,6-pentamethyl-4-piperidinyl)-[[3,5-bis(1,1-dimethylethyl)-4-hydroxyphenyl]methyl]butylmalonate which is present in the amount of 0.1 to 1% by weight; and
        (ii) phenol, 2-(5-chloro-2H-benzotriazole-2-yl)-6-(1,1-dimethylethyl)-4-methyl is present in the amount of 0.1 to 1% by weight; and
    shaping the thermoplastic polyurethane into the ophthalmic lens.

4. The method of claim 3 wherein the combining of components (i) and (ii) with the antioxidant polymerized product occurs in an extruder.

5. The method according to claim 1 or 3, wherein benzenepropanoic acid, 3(1,1-dimethylethyl)-4-hydroxy-5-methyl-1,1'-[1,2-ethanediylbis(oxy-2,1-ethanediyl)]ester is Irganox® 245, the commercial product sold by Ciba part of BASF; bis(1,2,2,6,6-pentamethyl-4-piperidinyl)-[[3,5-bis(1,1-dimethylethyl)-4-hydroxyphenyl]methyl]butylmalonate is the commercial product Tinuvin® 144, sold by Ciba part of BASF; phenol, 2-(5-chloro-2H-benzotriazole-2-yl)-6-(1,1-dimethylethyl)-4-methyl is the commercial product Tinuvin® 326, sold by Ciba part of BASF; and 2,2'-methylenebis(6-(2H-benzotriazol-2-yl)-4-1,1,3,3-tetramethylbutyl)phenol) is the commercial product Tinuvin® 360, sold by Ciba part of BASF.

6. The method according to claim 1 or 3, wherein the antioxidant is benzenepropanoic acid, 3(1,1-dimethylethyl)-4-hydroxy-5-methyl-1,1'-[1,2-ethanediylbis(oxy-2,1-ethanediyl)]ester and the light stabilizer is bis(1,2,2,6,6-pentamethyl-4-piperidinyl)-[[3,5-bis(1,1-dimethylethyl)-4-hydroxyphenyl]methyl]butylmalonate together with phenol, 2-(5-chloro-2H-benzotriazole-2-yl)-6-(1,1-dimethylethyl)-4-methyl.

7. The method according to claim 1, wherein the plurality of additives also includes
    a 2,2'-methylenebis(6-(2H-benzotriazol-2-yl)-4-1,1,3,3-tetramethylbutyl)phenol) present in the amount of 0.1 to 1% by weight.

8. The method according to claim 1 or 3, wherein
    the benzenepropanoic acid, 3(1,1-dimethylethyl)-4-hydroxy-5-methyl-1,1'-[1,2-ethanediylbis(oxy-2,1-ethanediyl)]ester is present in the amount of 0.1 to 0.5% by weight
    the bis(1,2,2,6,6-pentamethyl-4-piperidinyl)-[[3,5-bis(1,1-dimethylethyl)-4-hydroxyphenyl]methyl]butylmalonate is present in the amount of from 0.1 to 0.5% by weight, the phenol, 2-(5-chloro-2H-benzotriazole-2-yl)-6-(1,1-dimethylethyl)-4-methyl when present is in the amount of from 0.1 to 0.5% by weight, and the 2,2'-methylenebis(6-(2H-benzotriazol-2-yl)-4-1,1,3,3-tetramethylbutyl)phenol) when present is in the amount of from 0.1 to 0.5% by weight.

9. The thermoplastic polyurethane product obtained by the method of claim 1 or 3.

10. The thermoplastic polyurethane product obtained by the method of claim 5.

11. The thermoplastic polyurethane product obtained by the method of claim 6.

12. The thermoplastic polyurethane product obtained by the method of claim 7.

13. The thermoplastic polyurethane product obtained by the method of claim 8.

14. The ophthalmic lens according to claim 9 wherein its Yellowness Index does not increase by more than 4.0, after exposure in the Suntest for 200 hours.

15. The ophthalmic lens according to claim 10 wherein its Yellowness Index does not increase by more than 4.0, after exposure in the Suntest for 200 hours.

16. The ophthalmic lens according to claim 11 wherein its Yellowness Index does not increase by more than 4.0, after exposure in the Suntest for 200 hours.

17. The ophthalmic lens according to claim 12 wherein its Yellowness Index does not increase by more than 4.0, after exposure in the Suntest for 200 hours.

18. The ophthalmic lens according to claim 13 wherein its Yellowness Index does not increase by more than 4.0, after exposure in the Suntest for 200 hours.

19. The ophthalmic lens according to claim 14 wherein its Yellowness Index does not increase by more than 2.5, after exposure in the Suntest for 200 hours.

20. The ophthalmic lens according to claim 15 wherein its Yellowness Index does not increase by more than 2.5, after exposure in the Suntest for 200 hours.

21. The ophthalmic lens according to claim 16 wherein its Yellowness Index does not increase by more than 2.5, after exposure in the Suntest for 200 hours.

22. The ophthalmic lens according to claim 17 wherein its Yellowness Index does not increase by more than 2.5, after exposure in the Suntest for 200 hours.

23. The ophthalmic lens according to claim 18 wherein its Yellowness Index does not increase by more than 2.5, after exposure in the Suntest for 200 hours.

24. The ophthalmic lens according to claim 9 which further comprises a coating over at least part of a surface of the lens.

25. The method of claim 1, further comprising the step of shaping the thermoplastic polyurethane into the ophthalmic lens.

26. The method of claim 3, wherein the antioxidant polymerized product is also combined with 2,2'-methylenebis(6-(2H-benzotriazol-2-yl)-4-1,1,3,3-tetramethylbutyl)phenol) present in the amount of 0.1 to 1% by weight.

* * * * *